United States Patent [19]

Glucksman

[11] Patent Number: 5,404,803
[45] Date of Patent: Apr. 11, 1995

[54] FOOD STEAMER UTENSIL

[75] Inventor: Dov Z. Glucksman, Wenham, Mass.

[73] Assignee: Appliance Development Corporation, Danvers, Mass.

[21] Appl. No.: 991,976

[22] Filed: Dec. 17, 1992

[51] Int. Cl.⁶ .............................................. A47J 27/04
[52] U.S. Cl. ....................................... 99/473; 99/417; 99/341; 99/446; 126/369.1; 217/401
[58] Field of Search ................... 99/341, 415, 417, 450, 99/418, 339, 345, 473, 446; 126/369, 369.1, 369.2, 369.3, 20.1, 20.2; 219/401

[56] References Cited

U.S. PATENT DOCUMENTS

| | | | |
|---|---|---|---|
| 385,794 | 7/1888 | Davis | 126/396.2 |
| 2,565,614 | 8/1951 | Magley | 99/418 X |
| 3,774,008 | 11/1973 | Maniscalco | 126/369 X |
| 4,509,412 | 4/1985 | Whittenburg et al. | 99/331 |
| 4,655,192 | 4/1987 | Jovanovic | 126/369 X |
| 4,660,542 | 4/1987 | Scherer | 126/369 X |
| 5,097,753 | 3/1992 | Naft | 99/341 |
| 5,215,000 | 6/1993 | Desage et al. | 99/473 |

FOREIGN PATENT DOCUMENTS

149660 8/1930 Germany ........................... 126/369.2

Primary Examiner—David A. Scherbel
Assistant Examiner—Patrick Brinson
Attorney, Agent, or Firm—Cohen, Pontani, Lieberman, Pavane

[57] ABSTRACT

A food steamer utensil which comprises separable and self-contained steam generator and food cooking vessels each having their respective cover portions and base portions to define therebetween, a chamber. The vessels, when operatively connected, are fastened together by latching means and are disposed in side-by-side relationship. Steam is formed in the steam generator vessel by a heater immersed in water and the steam is conducted into the food cooking vessel where it contacts food to cook same in food receptacles. The steam enters the food cooking vessel as a jet stream and substantially uniformly disperses itself along the horizontal cross sectional area of the vessel, and in passing through a food receptacle which has perforations throughout the entire surface area of the receptacle effectively contacts all the food on the food receptacle. The base portion of the food cooking vessel constitutes a condensate collection receptacle which is used to collect the steam condensate and drippings resulting from the contact of the steam with the food. Electrical components for the food steamer utensil are contained within the steam generator vessel to obviate the location of any of such components in the food cooking vessel.

28 Claims, 7 Drawing Sheets

FOOD STEAMER UTENSIL

BACKGROUND OF INVENTION

This invention relates to a food steamer utensil, and more particularly to food steamer utensils wherein steam generated in one section of the utensil is brought into contact with the food in a food receptacle in another section, and the resulting condensate and drippings are collected in a third section of the utensil.

As steam cooking has become more popular in response to people seeking healthier ways to prepare their food, more such utensil appliances have been introduced to the market.

U.S. Pat. No. 222,296 discloses an early type of utensil which includes a pot in which a small amount of water is boiled off and food to be steamed is placed in the pot on a perforated trivet so that the food does not come in contact with the water.

In an effort to make self contained and self energized steam cooking utensils, several such products have been developed as shown is U.S. Pat. Nos. 4,509,412, 4,920,251, and 5,097,753, and to some extent, in West German patent 271,879 dated 8/1927.

The foregoing steaming appliances generally consist of a lower pan in which an electric heater is located that causes water surrounding the heater to boil. The food to be steamed is located on a perforated tray located above the water level and a cover is provided to prevent the steam from escaping. A typical drawback that such products encounter is that the condensate and drippings from the food return to the water surrounding the heater and cause an unpleasant odor when boiled off and also will cause staining of the heater and of the lower tray. To avoid and resolve the foregoing and other problems, the patentees of these utensils in the aforementioned U.S. and German patents have devised various means to divert the condensate from the water slated to be boiled off. The resulting structures have not been fully satisfactory.

SUMMARY OF THE INVENTION

It is an object of the present invention to provide a novel food steamer utensil which comprises two separable vessels, one providing the steaming function and the other vessel performing the cooking function to thereby maximize the effectiveness of the structure in accomplishing such functions and, furthermore, preventing any reboiling of food drippings.

Another object is to provide a novel food steamer utensil in which steam is generated quickly after energization of a heater by providing a steam generation compartment, the volumetric capacity of which is relatively small as compared to a water reservoir compartment which supplies water thereto.

Still another object is to provide a novel food steamer utensil wherein steam in the food cooking vessel is evenly dispersed for maximum contact with food therein.

A further object of this invention is to provide for the complete separation of electrical components from parts that contact the food, resulting in the ability of the user to safely place all the parts that come into contact with food in a dishwasher, whereby the separation also allows the user to bring the food compartment to the dining table while leaving the electrical components behind in the kitchen.

Another object is to provide for an accurate way for the user to determine the steaming time cycle, and for the utensil to shut off automatically while sounding off a signal alerting the cook that the food is ready to be served.

Yet another object is to provide for a safety mechanism that turns off the power to the heater when the steam generator vessel is disengaged from the food cooking vessel to avoid the danger of a jet of steam accidently striking a person's hand or body.

Another object is to provide a novel food steamer utensil which avoids the use of flame retardant plastic materials in any part which contacts food.

The food steamer utensil of the present invention comprises a steam generation vessel and a food cooking vessel which are separable and self contained, but are fastened together when in operation. Each vessel has its own cover portion and base portion and has defined therebetween a chamber. The chamber in the steam generation vessel is divided into a water reservoir compartment and a steam generating compartment, the latter of which contains a heater to generate steam. A steam nozzle or snout carries the steam from the steam generation vessel and introduces it as a jet stream into the chamber within the food cooking compartment. This chamber contains a food receptacle on which food to be cooked is disposed and maximum effective contact of such food is obtained by reason of the food receptacle having perforations throughout the entire surface area of the receptacle. The base portion of the food cooking vessel includes a condensate collection receptacle which collects the condensed steam and food drippings from the cooked food. By reason of the foregoing structure, food drippings do not enter the steam generation vessel for contact with the boiling water and the heater therein, thereby avoiding reboiling of such drippings and the consequent unpleasant odors. Electrical components for energizing and deenergizing the heater, and visual and auditory alarms for indicating connection to a source of power, and completion of the cooking cycle or process are all found in the steam generation vessel. The electrical components further deenergize the heater whenever the two vessels are disengaged by a latching mechanism to cause cessation of further steam generation and obviating thereby the accidental exposure of the user to the steam jet prior to the cooking process being completed.

DETAILED DESCRIPTION OF THE PREFERRED EMBODIMENTS

Figure 1:
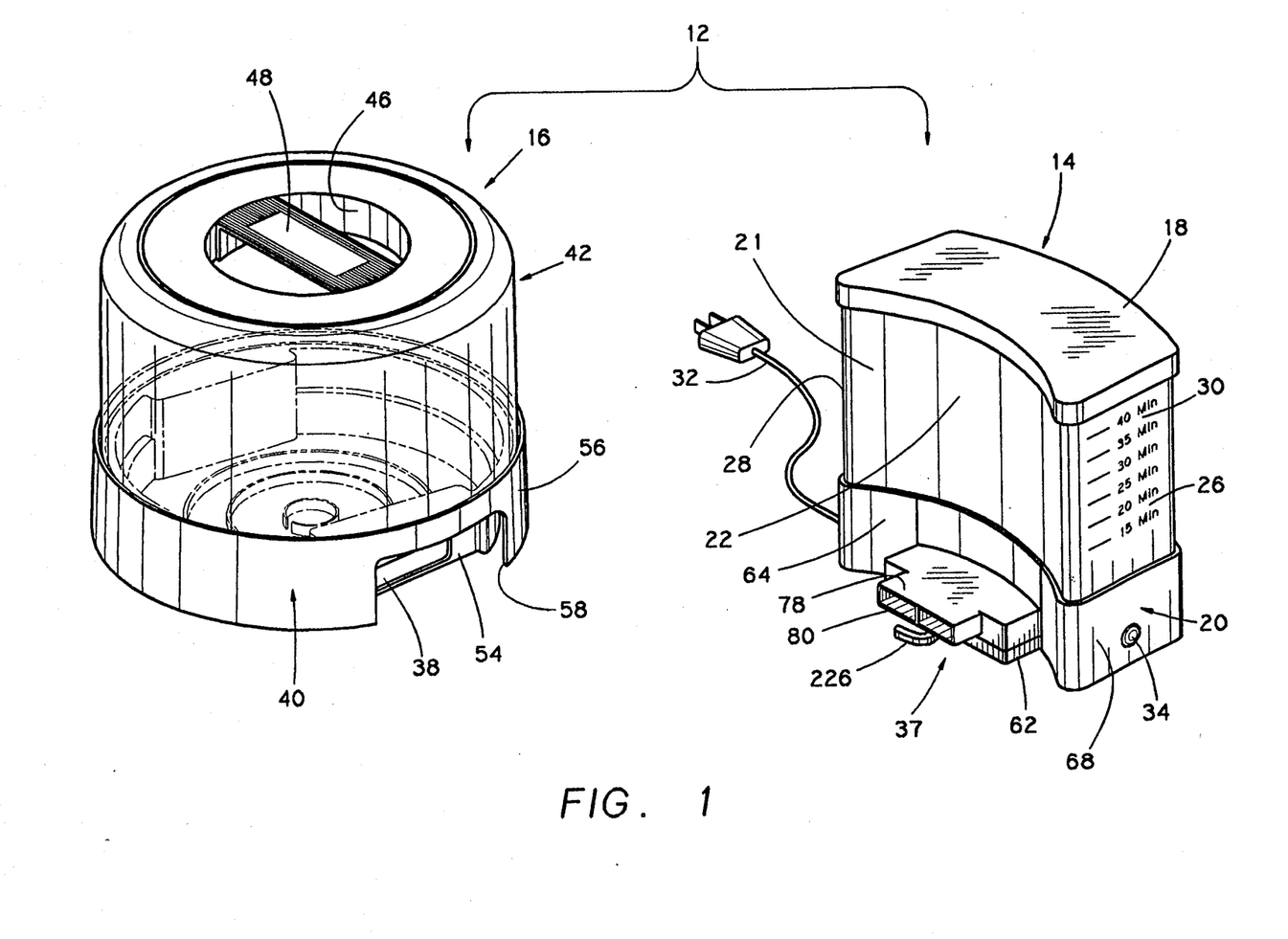
FIG. 1 is an isometric view of the food steamer utensil with its separable steam generator vessel and food cooking vessel shown disengaged from each other.

Referring now to the drawings and more particularly to FIG. 1 hereof, the food steamer utensil of present invention is generally designated by the reference character 12 and comprises a steam generator vessel 14 and a separable food cooking vessel 16. Vessels 14 and 16 are shown in FIG. 1 in a disengaged and non-operable position and when the utensil 12 is to be operably used to perform its function of steaming, the vessels 14 and 16 are engaged and in side-by-side relationship as may be understood by the showing in FIG. 2. Vessel 14 has an arcuate-shaped top cover portion 18 and an arcuate-shaped bottom base portion 20 and extending therebetween is a vertical exterior section 21 which comprises a pair of similarly shaped arcuate upstanding walls 22 and 24 (shown is FIG. 2) which are drawn from the same center of revolution so that walls 22 and 24 are parallel to each other.

Figure 2:
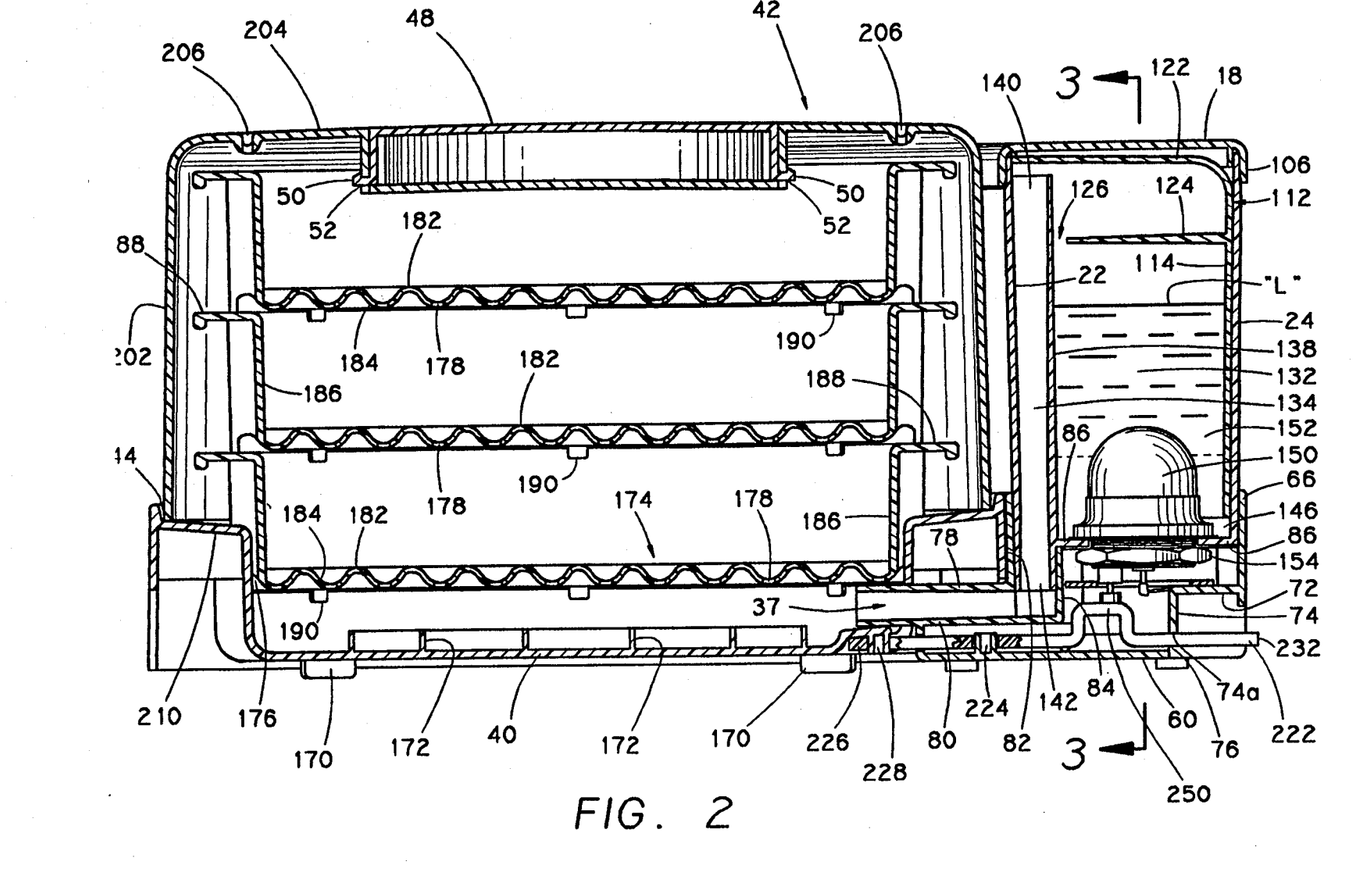
FIG. 2 is a cross sectional view, in elevation of the steam generator vessel and the food cooking vessel in an engaged condition.

A pair of oppositely disposed walls 26 and 28 complete the remainder of vertical exterior section 21 of vessel 14. Walls 22, 24, 26 and 28 are integral and constructed of transparent materials in order that the contents of vessel 14 may be visually observed. In this connection, indicia 30 is provided on wall 26 which, as will be explained hereinafter, permits the user to determine and control the length of time of the food cooking process desired to be performed by utensil 12. An electrical power cord 32 is provided in base portion 20 of vessel 14 for connection to a source of electrical power (not shown) for supplying electrical energy to vessel 14. An electrical indicator lamp 34 also is disposed on the opposite side of base portion 20, which when lit, indicates to an observer that power is being supplied to the heater 150.

As will be explained hereinafter, steam is generated within vessel 14 for transmission to and for use within food cooking vessel 16. The transmission of steam is accomplished through a steam discharge nozzle or snout 37 which protrudes from base portion 20 and is adapted for insertion into a recessed steam opening 38 formed in bottom base portion or tray 40 of vessel 16. Vessel 16 has a removable top cover portion 42 of circular dome-like configuration with a lower peripheral edge 44 (FIG. 2) resting on base portion 40. Cover portion 42 has a circular recess 46 (FIG. 1) which provides clearance for a user's fingers to grab a handle 48 to lift cover portion 42 from base portion 40. In a preferred embodiment, handle 48 is provided with four fish hook tabs 50 (FIG. 2) which engage small openings 52 in the cover portion. Base portion 40 has an inner wall 54, in which recess 38 is formed and a spaced concentrically disposed skirt or outer wall 56 with diametrically spaced hand openings 58, (one seen in FIG. 1) to permit a user to lift, the entire vessel 16 or the base portion 40 alone, by insertion of the user's hands in hand openings 58. As indicated hereinbefore, vessels 14 and 16, in FIG. 1, are shown in a disengaged or non-operable position but when operable for use, vessels 14 and 16 are engaged as best shown in FIG. 2. For purposes of explanation and in following the description hereinafter, the term "operable" is used to designate the engaged and connecting side-by-side relationship of the vessels 14 and 16 to perform its function in the steam cooking of food, and the term "non-operable" is used to designate the disengaged or non-connecting relationship of the vessels when separated for the desired purposes.

Base portion 20 of vessel 14 comprises a floor 60 which has an extension 62 protruding from base portion 20 (FIG. 1), and two pairs of upstanding and oppositely disposed walls 64, 66 and 68, 70; wall 68 carrying indicator lamp 34. Nozzle or snout 37 extends from wall 64 and overlaps the extension 62 as better seen in FIG. 1. Wall 66 has a horizontally extending ledge 72 (FIG. 2) which is provided with a depending wall portion 74 terminating along portion thereof at 74 A spaced from floor 60 to provide a defined space 76. Nozzle 37 is rectangular-shaped in vertical cross-section and includes a top 78 and a bottom 80, the latter engaging extension 62. Top 78 and bottom 80 each has an upstanding wall portion 82 and 84, respectively. A separator wall 86 extends horizontally from walls 22, 24, 26 and 28 (FIG. 3), which then is configured to merge into a vertical wall 88, and at the base thereof has a horizontal portion 90 with an opening 92 formed therein. The walls 86, 88 and 90 separate vessel 14 into an upper space or compartment 94 and a space or compartment 96 between said walls and floor 60. Wall 86 has a pair of depending bosses 98 through which screws (not shown) are driven in corresponding bosses 100 formed in floor 60 to secure the two elements together. A lower portion 102 of walls 22–28 extends below separator wall 86 to fit snugly within the inner surfaces 64–70 while the upper portion 104 of walls 22–28 is narrowly shaped to accommodate top cover portion 18 (best seen in FIG. 2 and 3). Cover portion 18 is provided with a lip 106 and a spaced circumferential rib 108 so that the space or gap between them insures a tight fit for cover portion 18 of vessel 14.

Cover portion 18 and base portion 20 define therebetween a chamber 110 which incorporates as part thereof, the spaces 94 and 96. Vertically disposed within chamber 110 is a steam shroud 112, which in horizontal cross section (best seen in FIG. 5), has a rearward arcuate shaped wall section 114 and parallel straight wall sections 116. Arcuate wall section 114 (FIG. 2) abuts wall 24. The vertically extending edges of section 116 are provided with a flanged lip 118 which is seated within vertical rails 120 formed on the interior surface of wall 22 to wedge shroud 112 securely thereon. Shroud 112 has a top or ceiling 122 (FIG. 2) and a horizontal baffle 124 which extends from wall sections 114 and 116 below ceiling 122 and terminates short of wall 22 to form a space 126. The edge of ceiling 122 above space 126 abuts against the inner surface of wall 22. The location of shroud 112 in chamber 110 defines a pair of water reservoir compartments 130 arranged on either side of a steam generator compartment 132. Formed integral with the inner surface of wall 22 is a vertical steam funnel passageway 134 (FIG. 5) which has a pair of straight walls 136 and a curved wall 138 integral therewith. The upper end 140 of funnel 134 is open and spaced immediately below ceiling 122 to communicate with steam generator compartment 132 and a lower end 142 of funnel 134 is open to steam nozzle 37. Shroud 112 is completely open at its lower end and has an edge portion 144, (FIG. 3) which along its arcuate wall section 114, is recessed or cut out in respect to the straight wall sections 116 to form a space 146. Lower edge 144 is seated on wall portion 90 in tight fitting relationship but spaced therefrom at space 146 to provide communication between water reservoir compartments 130 and the steam generator compartment 132. A dome shaped electric heater 150 is seated in opening 92 and as may be more clearly seen in FIG. 3, the heater sits in a well-like space 152 defined by vertical wall 88. Heater 150 is threaded to receive a large nut 154 which together with washer 154 securely fastens the heater to portion 90 and whereby the space above and below the heater are sealed from each other. Energization of heater 150 is effected by means to be described thereinafter.

Before proceeding further with a description of the food steamer utensil 12 of the present invention, it may be well to explain the operation of the steam generator vessel to this point and then describe the cooking vessel 16 and the operation of such vessels connected together. To that end, the operation of vessel 16 is commenced by removing cover portion 18 and water is poured into chamber 110 and in particular, water reservoir compartments 130 which communicate with each other, to a level "L" as seen in FIG. 2. The level of the water "L" will depend upon the determination of the required cooking time and accordingly, indicia 30 on wall 26 is utilized by the user in that regard. Since the time it takes to boil a given amount of water is always proportional to the heater wattage it is therefore simple to correlate the amount of water with the time it takes to boil off that amount of water. It is understood that there is almost a constant relationship between the amount of water and the time it takes the water to be changed into steam, or depleted, based on the fact that the latent heat of the water is constant and the BTU input of the heater 150 is also constant. Water from compartments 130 flows into steam generator compartment 132 by way of space 146, and obviously into well 152 to completely immerse heater 150 in water. The volumetric capacity of the water reservoir compartments 130 is substantially greater than that of steam generator compartment 132 so that only the water in compartment 132 is being heated at any point in time and not all of the water in vessel 14. In the energization of heater 150, steam gradually forms which rises upwardly in compartment 132 and in steam shroud 112, through the space 126 towards ceiling 122, and past baffle 124 which serves to prevent the agitated water, during boiling, from rising and spilling beyond that point into steam funnel passageway 134. The steam entering funnel 134 then passes downwardly therein and at the base or lower end 142 of the funnel enters steam nozzle 37 to exit therefrom.

Figure 3:
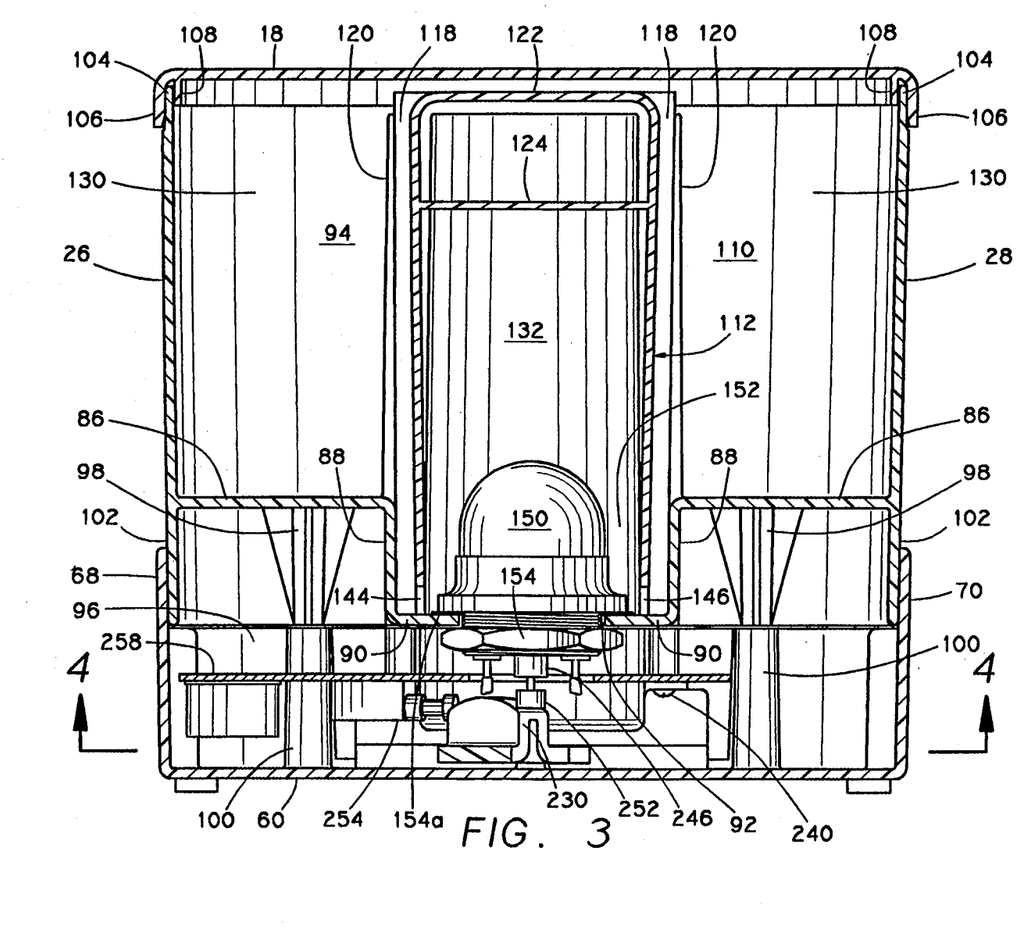
FIG. 3 is a cross sectional view, in elevation of the food steamer utensil along the lines 3—3 of FIG. 2.
Figures 6, 7:
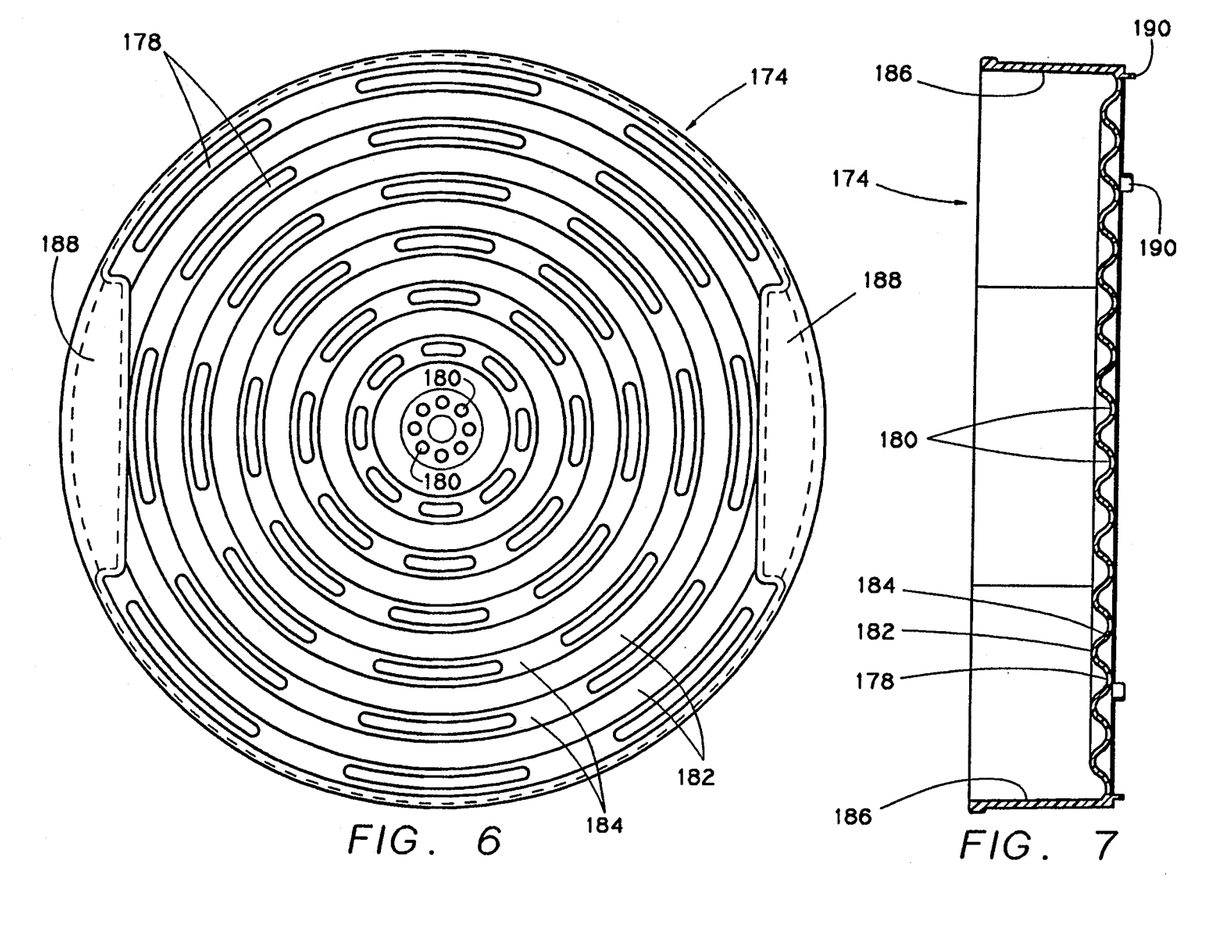
FIG. 6 is a top plan view of the food receptacle which is shown in FIG. 2.
FIG. 7 is a cross sectional view, in elevation, of the food receptacle of FIG. 6.

As indicated hereinbefore, steam generator vessel 14 and food cooking vessel 16 are constructed and arranged to perform their functions as a food steamer utensil when the vessels are engaged together and in a side-by-side relationship, as shown in FIG. 2 and 3, in contradistinction to that of FIG. 1 where the vessels are shown disengaged. As also brought out earlier, vessel 16 includes a circular bottom base portion or tray 40 which has feet 170 for setting the tray on a flat surface, such as a table. The interior surface of tray 40 is provided with a series of molded interrupted circular ribs 172 which serve to prevent sloshing of any liquid collected on the tray in the handling of the latter. Disposed immediately above tray 40 is a circular food receptacle tray 174 which sits upon a ledge 176 to space the latter from tray 40. Tray 174 as seen in FIG. 6 has a plurality of elongated perforations or slots 178 which extend throughout the surface of the tray and the slots are arranged in concentric rings as well as in radial directions towards the edge of the tray. A plurality of circular holes 180 are arranged in circular manner around the center of the tray. As better seen in FIGS. 2 and 7, where a cross section of tray of 174 is shown, a wave-like or undulating pattern is provided which included crests 182 and troughs 184. Slots 178 are located within troughs 184. By reason of the forgoing construction, when food is placed upon 174 it rests upon crests 182 and above and away from slots 178 so as not to block the latter. Tray 174 further is provided with an upstanding sidewall 186 and at two diametrically opposite locations (FIG. 6) with handles 188 and with four small feet 190. The present invention contemplates the use of a plurality of trays 174, three trays 174 being shown in FIG. 2. The disclosed trays 174 are identical in construction and since lower most tray 174 has been described in detail it is not believed necessary to further describe the trays except to point out that their construction permits them to be superimposed one upon the other as shown in FIG. 2. There may be instances where it is desired to cook food such as rice, with or without water for example, and if no water the size of the grains of rice would permit the grains to fall through slots 178. In such event, a bowl (not shown) having a solid or imperforate bottom would be used and the bowl would be arranged on lower most tray 174 and in place of the upper two trays 174. In such arrangement, no food would be on tray 174 and the bottom of the bowl would sit on crests 182, whereby steam flowing upwardly through slots 178 passes under the bowl and towards the top of the bowl to heat the food in the bowl.

Cover portion 42 is provided with a circumferential wall 202 and a top 204 and perforations 206 through which air and excess steam are allowed to escape. The lower edge 44 of wall 202 sits on a circumferential sloping rim 210 of tray 40 to inhibit the escape of steam therealong. In fact, water that may condense along wall 202 tends to form a liquid ring at the line of contact of edge 44 with rim 210 to create a natural seal.

Figure 4:
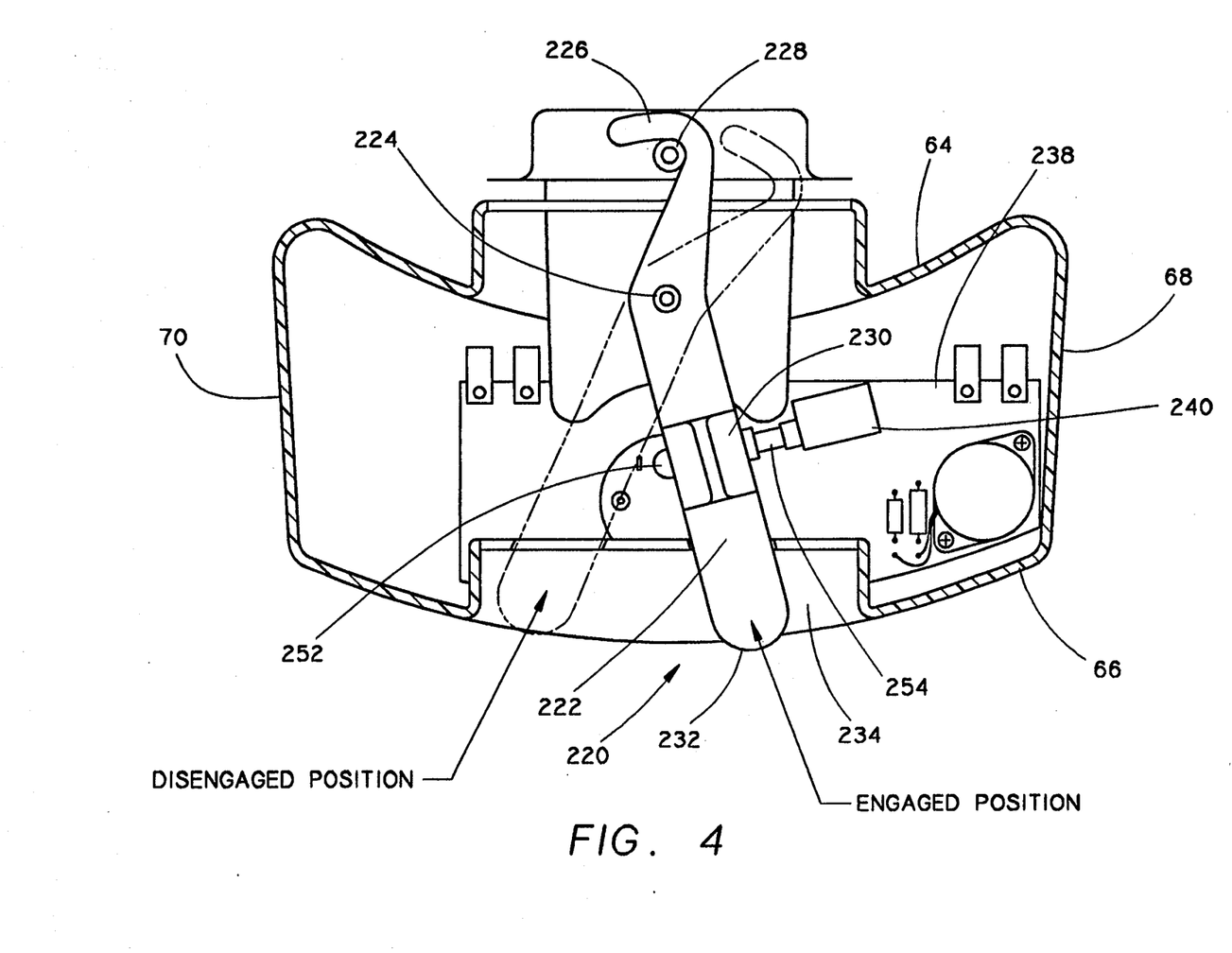
FIG. 4 is a partial cross sectional view of the food steamer utensil along the lines 4—4 of FIG. 3, showing in particular the latching mechanism and related circuitry components.

In its operable condition, vessels 14 and 16 of the utensil of the present invention are connected or engaged in a side-by-side relationship to permit the passage of steam generated in vessel 14 to vessel 16 to cook the food therein. To this end, base portion 20 includes a latching mechanism generally designated by the reference character 220 (see FIG. 2, 3 and 4), which comprises an actuating lever 222 which pivots about a post 224 projecting upwardly from floor 60 of base portion 20. One end of lever 222 has the configuration of a hook 226 which is adapted to engage a post 228 formed on the underside of tray 174. In FIG. 4, lever 222 is shown in full lines to indicate the latched or engaged condition of the latching mechanism and in broken lines to indicate the disengaged or unlatched condition of the mechanism. A raised portion 230 is formed on lever 222, intermediate hook 226 and the other end 232 of lever 222 which extends into a space 234, and which end is accessible for operation by a user.

Figure 8:
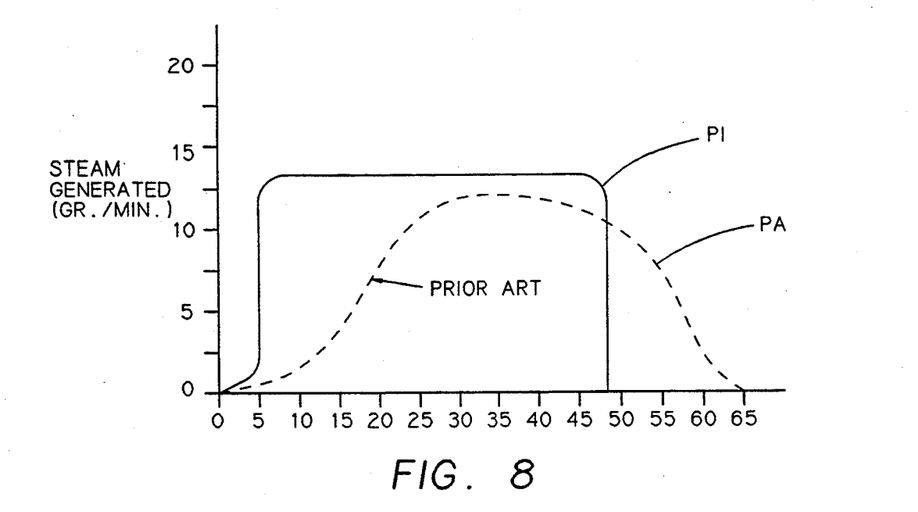
FIG. 8 is a graph demonstrating the performance of the food steamer utensil according to the invention in comparison to another food steamer utensil according to another concept.
Figure 9:
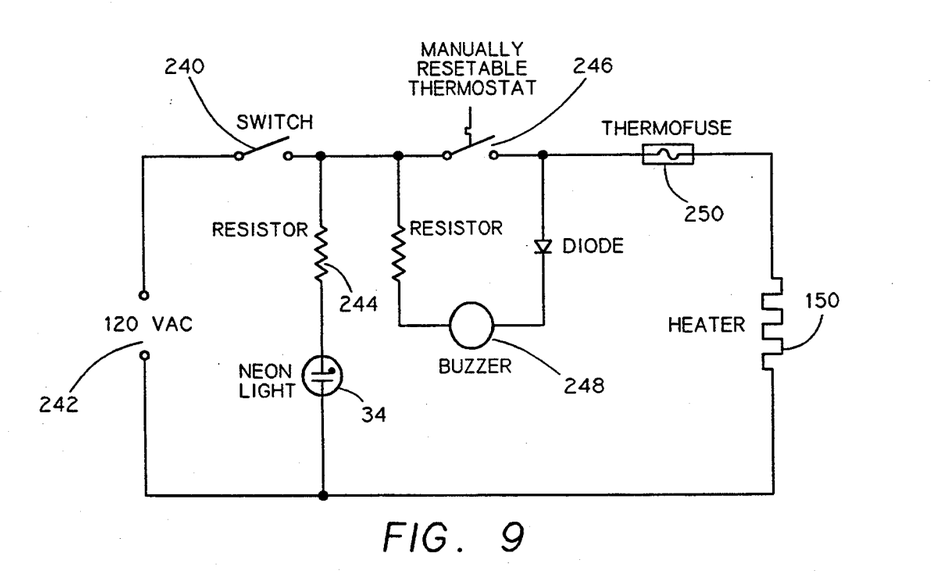
FIG. 9 is a schematic wiring diagram of the food steamer utensil according to the present invention.

A printed circuit terminal board 238 (FIG. 3 and 4) is provided in the space 96 of base portion 20 and is secured by screws 240 (FIG. 3). Board 238 carries several electrical components which are schematically shown in the circuit diagram of FIG. 8 and comprises a switch 240 connected to a source of alternating current 242 by electric cord 32 shown in FIG. 1. A resistor 244 and the indicator lamp 34, which may be a neon lamp, are connected across the source 242. A manually resettable thermostat 246 is arranged in series with switch 240 and in parallel with a buzzer 248. Arranged in series with thermostat 246 is a thermo-fuse 250 and the heater 150. Thermostat 246 has a reset movable button 252 (FIG. 3) which is arranged in the path of travel of lever 222 as to be engaged by raised portion 230. Switch 240 has a movable button 254 which also is in the path of travel of lever 222 and is actuable by the latter when the latching mechanism is in its engaged position (FIG. 4).

Coming now to the use and operation of food steamer utensil 12, the user first places food on the tray 174 and/or cooking bowl 192 and covers the food with dome cover portion 42. After determining the required cooking time, the user fills compartment 130 with water to the appropriate line of indicia 30 on wall 26 which corresponds to the predetermined cooking time. Steam generator vessel 14 is then placed in side-by-side operable relationship in connection with food cooking vessel 16 with nozzle 37 protruding through recess opening 38 in base portion 40. Lever 222 which previously was in the broken-line disengaged position as seen in FIG. 4 then is pivoted so that hook 226 engages post 228 to lock the vessels 14 and 16 together so that they can no longer be disengaged. The raised portion of lever 222, in moving from the disengaged to the engaged position, contacts button 252 of thermostat 246 to latch it in a closed position. When lever 222 reaches its full line engaged position it closes switch 240 and current is allowed to flow to energize heater 150. Heater 150 causes the water in steam generator compartment 132 to boil and steam is generated. When the steam fills shroud 112 above the water level "L" it can only escape downwards though funnel 134 and through steam nozzle 37 into food cooking vessel 16. The steaming process continues until the water in the water reservoir compartments 130 and steam generator compartment 132 is depleted. At that point, the temperature of heater 150 will rise and the thermostat 246 which is sensing the heater temperature opens its contacts to interrupt flow of current to the heater. When the thermostat 246 contacts opens, current flows through buzzer 248 and the resulting buzzing sound alerts the user that the cooking cycle is completed. The user then disengages the latch mechanism 220 by moving lever 222 clockwise, (as seen in FIG. 4, to open 5) the contacts of switch 240, which cause the buzzing sound to cease and permits the physical disengagement of vessels 14 and 16. It will be understood that indicator lamp 34 will stay lighted for as long as switch 240 is closed.

The utilization in the present invention of heater 150 in steam generator compartment 130 of substantially less volumetric capacity than that of the water reservoir compartments 130 permits the short start-up time of the utensil 12 in generating steam. This results because only a small amount of water in steam generating compartment 132 needs to be heated prior to boiling. It has been found that it takes only 30 to 40 seconds before steam is generated at a steady rate. Prior art appliances which locate the heater in a large pool of water require all of, the water has to be heated before effective steam generation is achieved. This may be better understood by reference to the graph of FIG. 8 wherein the rate of steam generated in grams per minute is plotted against time in seconds. The solid line curve PI represents the performance curve of the utensil 12 of the present invention and the broken line PA represents the performance curve of a prior art food steamer. It will be seen that the desirable rate of steam generation with the present invention is reached much in advance than that of the prior art appliance which in effect, shortens the required cooking time, which in these busy times of homemakers, is extremely desirable.

In addition to providing a faster cooking time, the present invention provides the user with an easy and accurate way of controlling the steaming time. The separable vessel 14 permits the simple correlation of the amount of water to the time it takes to boil off that amount of water in that the time to boil a given amount water is proportional to heater wattage. In many prior art devices a shallow basin is used to hold the water to be boiled. As a result, the amount of water cannot be accurately guaged due to the large cross section of the basin, or water container, and its low height. A prior art food steamer was tested having a shallow basin to correlate cooking time to the amount of water that was previously measured through the use of a graduated measuring cup. It was found that the accuracy of that correlation was inconsistent. It was observed that after a certain amount water boiled off the top of the heater, and it is exposed to air, the amount of heat transferred out of the heater is retarded, to cause a slow build up the internal temperature of the heater. Calcium deposits build on the surface of the heater, and depending upon the degree of calcification, the thermostat could deenergize the heater prematurely. In the embodiment of the present invention, heater 150 is located in well 152, with a small cross sectional area so that even if the heater is calcified to a large extent and thermostat 246 would turn it off prematurely; still the error would be relatively small owing to the small amount of water remaining in the well 152.

The steam from nozzle 37 into food cooking vessel 16 issues as a jet-like stream of steam between trays 40 and 174 and because the steam enters a larger volumetric space the stream of steam expands to disperse itself uniformly and evenly across the lower side of tray 174. The uniformly dispersed steam then passes through slots 178 in tray 174 and if food is deposited thereon, the pattern of slots 178 permit contact of the steam with the food on any part of tray 174. This is in contradistinction to many prior art food steamers which do not have the present invention's novel separable vessels. Prior food steamers address a problem common in steaming food which is the return of condensate to the fresh water that still is to be boiled. To overcome this problem, the designers of such food steamers have undertaken to divert the condensate away from the fresh water but in doing so had to leave a large portion of the food receptacle or tray, solid or unperforated resulting in poor overall contact between the steam and the food. In some instances, the entire food tray is unperforated so that no steam can flow through the tray but rather is forced around the tray to find its way onto the food.

Figure 5:
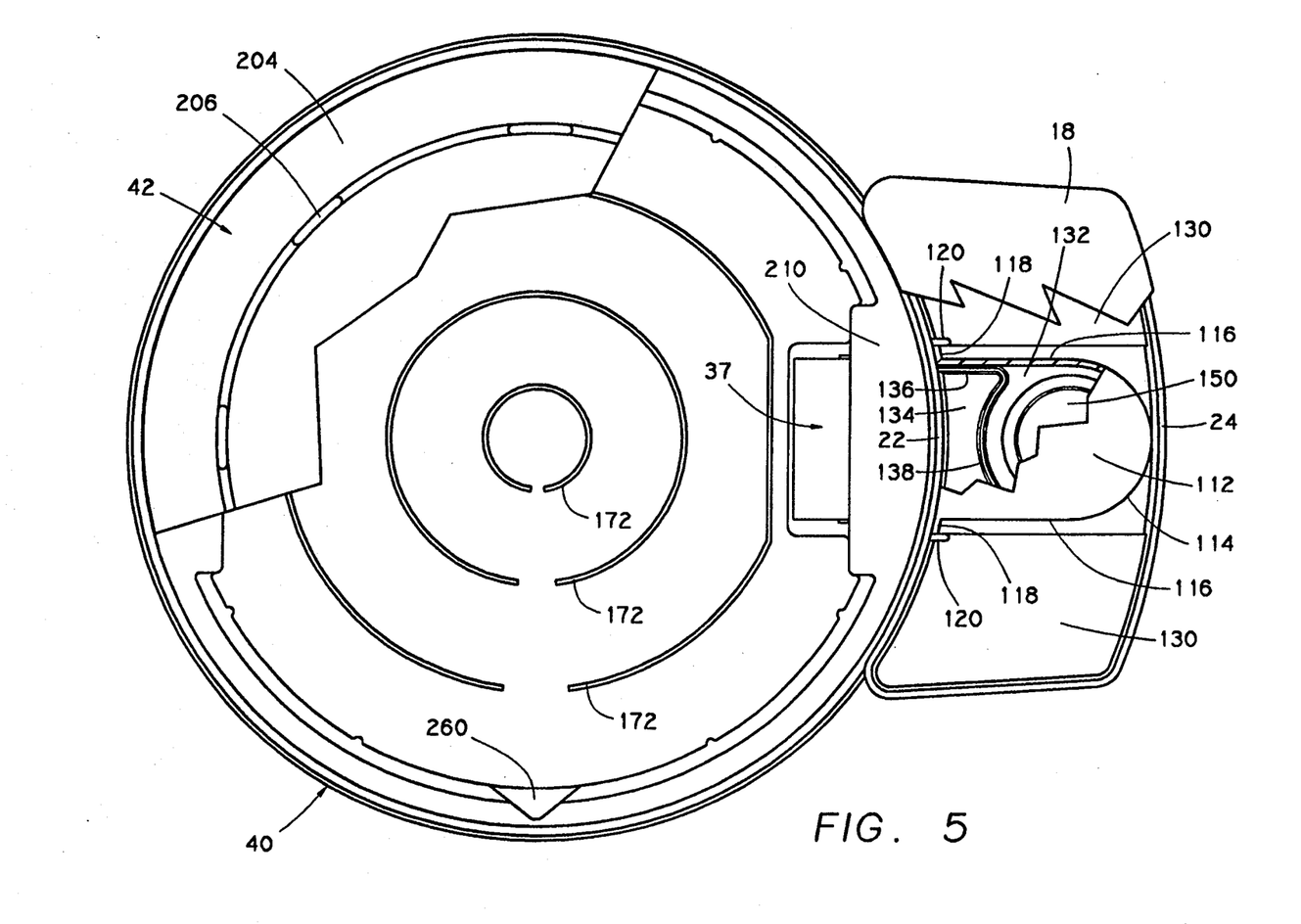
FIG. 5 is a partial cut-away view of the food steamer utensil showing portions of the steam generating compartment and the food cooking compartment.

In the embodiment of the present invention, after steam passes though slots 178 and contacts the food on tray 174 or serves its function in cooking the food in 182, the steam condenses and flows back though slots 178 and is collected on base portion or tray 40 and is not at any time commingled with the water in vessel 14. Inasmuch as base portion 40 is separable and in contact with heater 150, condensate collected therein can be retained and poured therefrom. As was earlier brought out, the anti sloshing ribs 172 permit the handling of the base portion 40 in a clean and safe manner. Many recipes call for the use of drippings from food being steamed, especially seafood where the drippings can be combined into sauces and gravies. Base portion 40 has a pouring spout 260, as seen in FIG. 5, so that the condensate and drippings can be easily poured out through spout 260.

The present invention embodies a further advantage in having all of its electrical components in the base of vessel 14 and out of contact with and separated from the parts which are in contact with the food. This has the desirable feature that the parts of the food cooking vessel 16 which contact food can be placed in a dishwasher or washed, without the fear of wetting the electrical components. Moreover, usually, plastic materials which are approved by Underwriter Laboratories for the enclosure of electrical components are required to be "Flame retardant". It is understood that flame retardation additives are usually carcinogenic and should not contact the food.

The structure of the present invention also contains a safety feature in that the jet-like stream of steam cannot accidentally strike a user when vessels 14 and 16 are separated before the cooking process is completed. This problem is not encountered because to separate the vessels 14 and 16, lever 222 must be moved to unlocking position which causes switch 240 to be open, thereby de-energizing heater 150 to stop generation of the steam.

There also are times when the user may wish to bring the food cooking vessel 16 to a table to serve the steamed food from it and this may be done without having the nuisance of a dangling elenctic cord which in the present invention is connected to vessel 14.

While there has been shown and described a particular embodiment of the invention, it will be obvious to those skilled in the art that changes and modifications can be made therein without departing from the invention, and therefore, the appended claims shall be understood to cover all such changes and modifications as fall within the true spirit and scope of the invention.

What is claimed is:

1. A portable food steamer utensil assembly comprising, a vertically disposed steam generator vessel, a vertically disposed food cooking vessel, said vessels being separable and when assembled together being interlocked one with the other with their vertical axes arranged in non-aligned positions and latching means for securely fastening said vessels in side-by-side relationship, and said latching means having an actuable portion disposed in the base portion of the steam generator vessel, each vessel having a base portion and a cover portion defining a chamber, a heater disposed in the chamber of the steam generator vessel for heating water herein to generate steam, steam conduit means in the respective base portions of said vessels including a steam outlet in the steam generator vessel and a recessed steam inlet opening in the food cooking vessel and a nozzle connecting said steam inlet with said steam outlet and communicating the chambers of said vessels, when assembled together, to provide steam from the steam generator vessel to the chamber of said food cooking vessel, and a food receptacle disposed in the chamber of the food cooking vessel for carrying food to be cooked by the steam and entering said last mentioned chamber, the resulting steam condensate therefrom being collected in said food cooking vessel.

2. A portable food steamer utensil assembly comprising, a vertically disposed steam generator vessel, a vertically disposed food cooking vessel, said vessels being separable and when assembled together being interlocked one with the other with their vertical axes arranged in non-aligned positions and in side-by-side relationship, each vessel having a base portion and a cover portion defining a chamber, a heater disposed in the chamber of the steam generator vessel for heating water herein to generate steam, steam conduit means in the respective base portions of said vessels including a steam outlet in the steam generator vessel and a steam inlet in the food cooking vessel and a nozzle connecting said steam inlet with said steam outlet and communicating the chambers of said vessels, when assembled together, to provide steam from the steam generator vessel to the chamber of said food cooking vessel, and a food receptacle disposed in the chamber of the food cooking vessel for carrying food to be cooked by the steam and entering said last mentioned chamber, the resulting steam condensate therefrom being collected in said food cooking vessel, wherein electrical circuitry is provided in the steam generator vessel for connection to a power source to energize the heater, said circuitry including a powerswitch, the heater, a manual resetable thermostat, buzzer, and an indicator lamp, said indicator lamp indicating when current is flowing through the heater and said buzzer being activated upon actuation of said thermostat.

3. The food steamer unit utensil of claim 2, wherein a movable latch member is provided in the steam generator vessel and wherein each of the power switch and the resettable thermostat includes movable actuating buttons, said movable actuating buttons being in the path of travel of said latch member.

4. The food steamer utensil of claim 3, wherein said latch member and said circuitry are disposed in the base portion of said steam generator vessel.

5. The food steamer utensil of claim 2, wherein the food cooking vessel is cylindrical in configuration and circular in transverse cross section, and said steam generator vessel has a pair of parallel semi-arcuate upstanding walls defining the chamber therein, both said walls being concave, one of said concave walls being disposed in juxtaposition with the food cooking vessel when said vessels are disposed in connecting operable side-by-side relationship.

6. The food steamer utensil of claim 5, wherein the radii of said concave walls are taken from the same center of revolution.

7. The food steamer utensil of claim 5, wherein said chamber of the steam generator vessel is further defined by a pair of oppositely disposed side walls, a least one wall of said last mentioned chamber being made of transparent material for viewing the contents of the chamber and said one wall containing indicia thereon.

8. A portable food steamer utensil assembly comprising, a vertically disposed steam generator vessel, a vertically disposed food cooking vessel, said vessels being separable and when assembled together being interlocked one with the other with their vertical axes arranged in non-aligned positions and in side-by-side relationship, each vessel having a base portion and a cover portion defining a chamber, a heater disposed in the chamber of the steam generator vessel for heating water herein to generate steam, steam conduit means in the respective base portions of said vessels including a steam outlet in the steam generator vessel and a steam inlet in the food cooking vessel and a nozzle connecting said steam inlet with said steam outlet and communicating the chambers of said vessels, when assembled together, to provide steam from the steam generator vessel to the chamber of said food cooking vessel, and a food receptacle disposed in the chamber of the food cooking vessel for carrying food to be cooked by the steam and entering said last mentioned chamber, the resulting steam condensate therefrom being collected in said food cooking vessel, said chamber of said steam generator vessel being divided into a water reservoir compartment and a steam generator compartment, with said heater being carried within said last mentioned compartment, said compartments are vertically disposed, with the upper ends thereof being adjacent the cover portion, and the lower ends being adjacent to the base portion, said heater and said steam generator compartment being arranged at said base portion.

9. The food steamer utensil of claim 10, wherein said compartments are in abutting relationship and are substantially sealed from each other to maintain a separation of fluids in their respective compartments, said compartments having a common wall which is provided with an opening therein to permit flow of water from the water reservoir compartment to the steam generator compartment.

10. The food steamer utensil of claim 9, wherein said opening is provided in the lower portion of said common wall adjacent the base portion of the steam generator vessel.

11. The food steamer utensil of claim 8, wherein the water reservoir compartment is divided into two spaced sections and the steam generating compartment is arranged intermediate said spaced sections, said water reservoir compartment having a greater volumetric capacity than said steam generator compartment.

12. The food steamer utensil of claim 8, wherein a steam passageway means is provided within the steam generator vessel, said steam passageway means being sealed with respect to the water reservoir compartment but in communication with the steam generator compartment to receive steam generated therein, and a steam outlet is provided in said steam generator vessel and in communication with the steam passageway means to discharge steam from said last mentioned vessel.

13. The food steamer utensil of claim 12, wherein a steam discharge nozzle protrudes from the exterior of the steam generator vessel and is in communication with said steam passageways means outlet.

14. The food steamer utensil of claim 12, wherein the steam discharge nozzle is arranged adjacent to the base portion of said steam generator vessel.

15. A portable food steamer utensil assembly comprising, a vertically disposed steam generator vessel, a vertically disposed food cooking vessel, said vessels being separable and when assembled together being interlocked one with the other with their vertical axes arranged in non-aligned positions and in side-by-side relationship, each vessel having a base portion and a cover portion defining a chamber, a heater disposed in the chamber of the Steam generator vessel for heating water herein to generate steam, steam conduit means in the respective base portions of said vessels including a steam outlet in the steam generator vessel and a steam inlet in the food cooking vessel and a nozzle connecting said steam inlet with said steam outlet and communicating the chambers of said vessels, when assembled together, to provide steam from the steam generator vessel to the chamber of said food cooking vessel, and a food receptacle disposed in the chamber of the food cooking vessel for carrying food to be cooked by the steam and entering said last mentioned chamber, the resulting steam condensate therefrom being collected in said food cooking vessel, a condensate collection receptacle arranged in said food cooking vessel spaced below said food recepticle to collect the steam condensate used to cook the food, the condensate collection receptacle is disposed below the level of the water in the steam generator vessel.

16. The food steamer utensil of claim 15, wherein the condensate collection tray is provided at the base portion on the food cooking vessel.

17. The food steamer utensil of claim 15, wherein the steam conduit means is connected to the food cooking vessel to introduce steam therein between the food receptacle and the condensate collection receptacle.

18. The food steamer unit of claim 15, wherein said food receptacle and said condensate collection tray are coextensive.

19. The food steamer utensil of claim 18, wherein the condensate collection receptacle is provided with a peripheral ledge for seating the food receptacle.

20. The food steamer utensil of claim 16, wherein the condensate collection receptacle constitutes a removable base for the food cooking vessel and upon which a peripheral lip of the cover of said vessel rests.

21. The food steamer utensil of claim 17, wherein the steam conduit means comprises a steam discharge nozzle for introducing a jet-like stream of steam whereby said stream expands for greater and uniform dispersion along the bottom of the food receptacle facing the condensate collection receptacle.

22. The food steamer utensil of claim 15, wherein the food receptacle comprises a circular tray having perforations for admitting steam therethrough, said perforations extending radially from the center of the tray and in concentric rings to the peripheral edge thereof, whereby food on any portion of said tray is contacted by steam from the space below.

23. The food steamer utensil of claim 22, wherein the perforations are elongated and are non-circular and separated by raised surfaces on which the food rests.

24. The food steamer utensil of claim 20, wherein said condensate collection receptacle is substantially flat, and said receptacle is provided with ribs to obviate sloshing of condensate during handling of said condensate collection receptacle.

25. The food steamer utensil of claim 21, wherein said condensate receptacle has a peripheral wall provided with an opening therein to permit entry of the steam discharge nozzle for projection into the space between the food receptacle and the condensate collection receptacle.

26. The food steamer utensil of claim 21, wherein a latching mechanism is provided for securely fastening said steam generator vessel and said food cooking vessels together, said latching mechnisim including an actuating lever on said steam generating vessel and a post on said food cooking vessel.

27. The food steamer utensil of claim 26, wherein the actuating lever also extends through said opening for said steam discharge nozzle.

28. The food steamer utensil of claim 15, wherein switch means are provided to connect the heater to a source of power to energize said heater, thermostat means connected in circuit with the switch means and the heater for deenergizing the heater when the temperature of said heater exceeds a predetermined value, and indicating means being operable upon operation of said thermostat means to alert a user to the completion of a cooking cycle.

* * * * *